United States Patent
Luukko

(10) Patent No.: US 6,498,452 B1
(45) Date of Patent: Dec. 24, 2002

(54) STARTING PROCEDURE OF OPEN-LOOP VECTOR CONTROL IN SYNCHRONOUS MACHINE

(75) Inventor: Julius Luukko, Lappeenranta (FI)

(73) Assignee: ABB Oy, Helsinki (FI)

( * ) Notice: Subject to any disclaimer, the term of this patent is extended or adjusted under 35 U.S.C. 154(b) by 0 days.

(21) Appl. No.: 09/958,949

(22) PCT Filed: May 18, 2000

(86) PCT No.: PCT/FI00/00446

§ 371 (c)(1),
(2), (4) Date: Dec. 4, 2001

(87) PCT Pub. No.: WO00/72437

PCT Pub. Date: Nov. 30, 2000

(30) Foreign Application Priority Data

May 19, 1999 (FI) .................................................. 991144

(51) Int. Cl.[7] .............................................. H02P 1/46
(52) U.S. Cl. ........................ 318/700; 318/721; 318/254; 318/439; 318/138
(58) Field of Search ................................ 318/254, 700, 318/711, 718, 721, 778, 439, 138

(56) References Cited

U.S. PATENT DOCUMENTS

| | | | | |
|---|---|---|---|---|
| 4,088,935 A | * | 5/1978 | D'Atre et al. | 318/740 |
| 4,454,461 A | * | 6/1984 | Blaschke et al. | 318/717 |
| 4,713,594 A | * | 12/1987 | Bose et al. | 318/685 |
| 5,144,564 A | * | 9/1992 | Naidu et al. | 318/721 |
| 5,339,012 A | * | 8/1994 | Schroedl et al. | 318/138 |
| 5,796,235 A | * | 8/1998 | Schrodl et al. | 318/254 |
| 5,929,590 A | * | 7/1999 | Tang | 318/254 |

FOREIGN PATENT DOCUMENTS

WO  WO 90/12278  10/1990

* cited by examiner

*Primary Examiner*—Rita Leykin
(74) *Attorney, Agent, or Firm*—Dykema Gossett PLLC

(57) ABSTRACT

A method for starting an open-loop vector control of a synchronous machine by determining a stator inductance model of the machine; measuring the stator iductance in a plurality of directions; arranging the measured inductances in the model to form model parameters resulting in minimum error; checking the polarity of rotor magnetization to verify the direction thereof; initializing flux linkages of the open-loop vector control according to the model parameters and the direction of rotor magnetization; and starting the machine by the open-loop vector control method.

4 Claims, 3 Drawing Sheets

STARTING PROCEDURE OF OPEN-LOOP VECTOR CONTROL IN SYNCHRONOUS MACHINE

BACKGROUND OF THE INVENTION

The present invention relates to a method of starting open-loop vector control in a synchronous machine, the method comprising the steps of determining a stator inductance model of the synchronous machine and measuring the stator inductance in a plurality of directions.

Vector control refers to a manner of controlling an AC motor which allows flux linkage and torque of the motor to be controlled independently like in a DC motor. In the DC motor, direct currents influencing the flux linkage and the torque are controlled, while in the AC motor both the amplitude and the phase angle of the currents have to be controlled. Thus, current vectors are controlled, from which comes the term vector control.

To implement vector control, the flux linkage and the current of the motor have to be known. The flux linkage of the motor is generated by the action of stator and rotor currents in the inductances of the machine. In an asynchronous machine, the rotor current has to be estimated and the estimation requires information on rotation speed of the rotor. This requires measured or estimated rotation speed of the rotor. In the synchronous machine, a magnetization current independent of stator magnetization is applied to the rotor, or the rotor magnetization is implemented with permanent magnets and its influence, seen from the stator, shows in the direction of the rotor position angle. To know the flux linkage caused by the position angle, the position angle of the rotor has to be measured or estimated.

When vector control of the AC motor employs a measured rotation speed or position angle of the rotor, the control method is known as the closed-loop vector control. If the rotation speed or the position angle is estimated, the control method is known as the open-loop vector control. Depending on the implementation method, a variable to be estimated can also be the stator flux linkage, apart from the rotor angle or angular speed.

When the synchronous machine is started by vector control, the machine's stator flux linkage has the initial value $\psi_{s0}$, which is dependent on the rotor magnetization $\psi_f$ and the rotor position angle $\theta_r$ as follows:

$$\psi_{s0} = \psi_f e^{j\theta_r}.$$

When voltage $u_s$ influences the stator flux linkage, the stator flux linkage changes in accordance with the equation $$\psi_s = \psi_{s0} + \int_{t_1}^{t_2} (u_s - R_s i_s) dt.$$

It appears from the equation that when integrating the stator flux linkage a previous value of the stator flux linkage is required, apart from the voltage and current values. Thus, to start the machine controllably, information on the initial position angle of the rotor is required. When employing the closed-loop vector control, the initial angle is measured, whereas when employing the open-loop vector control, the initial angle has to be defined by estimation. When the rotor rotates, the rotor flux linkage generates an electromotive force which can be utilized in vector control in a normal operating situation, but at a rotor standstill there is no electromotive force.

In a salient pole synchronous machine, such as a separately excited synchronous machine or one with permanent magnet magnetization or in a synchronous reluctance machine, the stator inductance $L_s$ in stationary coordinates varies as a function of the rotor angle $\theta_r$ as presented in the following equation $$L_s = L_{s0} + L_{s2} \cos 2\theta_r,$$

and FIG. 1 shows a graphic illustration of the equation. It appears from the figure that the inductance varies around the basic value $L_{s0}$ at twice the rotor angle in a magnitude indicated by the inductance coefficient $L_{s2}$. The inductance coefficients $L_{s0}$ and $L_{s2}$ are defined as follows $$L_{s0} = \frac{L_{sd} + L_{sq}}{2},$$

$$L_{s2} = \frac{L_{sd} - L_{sq}}{2},$$

where the inductances $L_{sd}$ and $L_{sq}$ are the direct-axis and quadrature-axis transient inductances of the synchronous machine.

To utilize the above equation for defining the initial angle of the rotor is known per se and it is set forth, for instance, in the articles by S. Östlund and M. Brokemper "Sensorless rotor-position detection from zero to rated speed for an integrated PM synchronous motor drive", *IEEE Transactions on Industry Applications*, vol. 32, pp. 1158–1165, September/October 1996, and by M. Schroedl "Operation of the permanent magnet synchronous machine without a mechanical sensor", *Int. Conf. On Power Electronics and Variable Speed Drives*, pp. 51–55, 1990.

According to the article by M. Leksell, L. Harnefors and H.-P. Nee "Machine design considerations for sensorless control of PM motors", *Proceedings of the International Conference on Electrical Machines ICEM'98*, pp. 619–624, 1998, sinusoidally altering voltage is supplied to a stator in the assumed direct-axis direction of the rotor. If this results in a quadrature-axis current in the assumed rotor coordinates, the assumed rotor coordinates are corrected such that the quadrature-axis current disappears. The reference states that a switching frequency of the frequency converter supplying the synchronous machine should be at least ten times the frequency of supply voltage. Thus, the supply voltage maximum frequency of a frequency converter capable of 5 to 10 kHz switching frequency, for instance, is between 500 and 1000 Hz. This is sufficient for an algorithm to function. Switching frequencies as high as this are achieved by IGBT frequency converters, but frequency converters with GTO or IGCT power switches, required at higher powers, have the maximum switching frequency of less than 1 kHz. The maximum frequency of the supply voltage in the initial angle estimation remains then below 100 Hz. At such a low frequency the machine develops torque and the algorithm becomes considerably less accurate.

In the reference by M. Schroedl, 1990, the initial angle is calculated directly from one inductance measurement, or, if more measurements are employed, the additional information is utilized by eliminating the inductance parameters. A drawback with the method is that an error, which is inevitable in measuring, has a great influence. One example of actual inductance measurement with a permanent magnet machine at rotor angles $\theta_r = [0, \ldots, 2\pi]$ is shown in FIG. 2. The figure shows theoretically great deviations from the sine curve. The inductance measurement is effected such that a stator is fed with a current impulse which causes flux linkage on the basis of which the inductance is calculated. Errors may arise from an error in current measurement or from the fact that the measuring current produces torque that swings the rotor.

From the inductance expression in the stationary coordinates it is possible to derive an expression for a rotor angle $$\theta_r = \frac{1}{2}\arccos\frac{L_s - L_{s0}}{L_{s2}} + n\pi,$$

where n is an integer. The influence of the error in the measured $L_s$ can be studied by differentiating $\theta_r$ with respect to $L_s$:

$$\frac{d\theta_r}{dL_s} = -\frac{1}{2L_{s2}}\frac{1}{\sqrt{1-\left(\frac{L_s-L_{s0}}{L_{s2}}\right)^2}}.$$

This allows calculating an error estimate for the angle $$\Delta\theta_r \approx \frac{d\theta_r}{dL_s}\Delta L_s.$$

It is observed that $$\Delta\theta_r \to \infty, \quad \text{when} \quad \frac{L_s - L_{s0}}{L_{s2}} \to 1.$$

It is observed from the above that, when the inductance difference between the direct-axis and quadrature-axis directions is small, the error estimate of the angle approaches infinite. In other words, initial rotor angle definition based on inductance measurings becomes the more unreliable, the closer to one another the magnitudes of the direct-axis and quadrature-axis inductances of the rotor.

In the method presented in the reference by S. Östlund and M. Brokemper the rotor angle is not calculated directly, but the minimum inductance is searched by starting the measuring of inductances in different directions first at long intervals and when approaching the minimum by reducing the angular difference of successive measurings. Even though it is not mentioned in the article, the method easily catches fictitious minima resulting from measuring errors, and therefore, an error value may be extremely high.

On the basis of the above, the influence of the inductance measuring errors should be reduced somehow. One method could be to employ several measurings in each direction and to calculate the average from the measured inductances, yet this procedure does not eliminate the influence of a systematic error.

BRIEF DESCRIPTION OF THE INVENTION

The object of the present invention is to provide a method which avoids the above-mentioned disadvantages and enables starting of an open-loop vector control in a synchronous machine in a reliable manner. This is achieved by the method of the invention which is characterized by comprising the steps of arranging measured stator inductances in a determined stator inductance model in order to form model parameters giving the minimum error, checking magnetization polarity of a rotor in order to verify the direction of the rotor magnetization, initializing flux linkages of the open-loop vector control according to the formed model parameters and the direction of the rotor magnetization, and starting the synchronous machine by the vector control method.

The method of the invention is based on the idea that the magnitude of the stator inductance is measured in a plurality of directions and the inductance values obtained as measurement results are arranged in the inductance model of the machine. As a result of the arrangement, very accurate information on the initial rotor angle of the synchronous machine is obtained. In addition, by utilizing the method of the invention, information on the initial value of the rotor magnetization in the stationary coordinates is obtained, and consequently the machine can be started in a reliable manner without transients or jerking startup.

BRIEF DESCRIPTION OF THE DRAWINGS

In the following the invention will be described in greater detail in connection with preferred embodiments with reference to the attached drawings, wherein.

DETAILED DESCRIPTION OF THE INVENTION

According to the invention, starting of an open-loop vector control in a synchronous machine first comprises the step of determining a stator inductance model of the synchronous machine $L_s = L_{s0} + L_{s2} \cos 2\theta_r$. The equation shows how the inductance depends on the rotor angle in stationary coordinates. The equation thus proves how the inductance measured in the direction of x-axis of the stator coordinates changes when the rotor is rotated a degree of an angle $\theta_r$.

Figure 3:
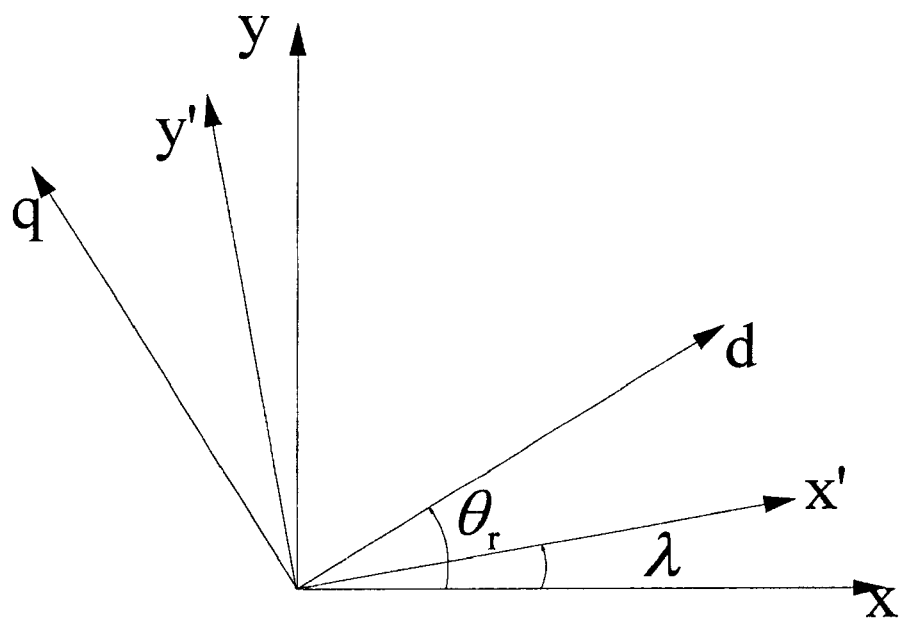
FIG. 3 shows the relations between the coordinates.

When it is desired to determine the initial rotor angle, it is not possible to rotate the rotor at different rotor position angles for measuring the inductance. Instead, the stator coordinates are rotated to the angle, in the direction of which the inductance is measured. These rotatable stator coordinates are referred to as virtual stator coordinates. FIG. 3 illustrates various coordinates and they are indicated such that the stator coordinates are coordinates xy, the virtual stator coordinates are coordinates x'y' and the rotor coordinates are dq.

Then the inductance model in the virtual stator coordinates may be written as $$L_s = L_{s0} + L_{s2}\cos[2(\theta_r - \lambda)]$$
$$= L_{s0} + L_{s2}\cos[2(\lambda - \theta_r)]$$
$$= L_{s0} + L_{s2}\cos(2\lambda + \varphi),$$

where $\theta_r$ is the rotor angle in the stationary coordinates, $\lambda$ is an angle in the virtual coordinates and $\theta_r - \lambda$ is the rotor angle in the virtual coordinates. By introducing a parameter $\psi = -2\theta_r$, it is possible to simplify the equations under study. So the desired rotor angle in the stationary coordinates is given by $$\theta_r = -\frac{\varphi}{2}.$$

Figure 1:
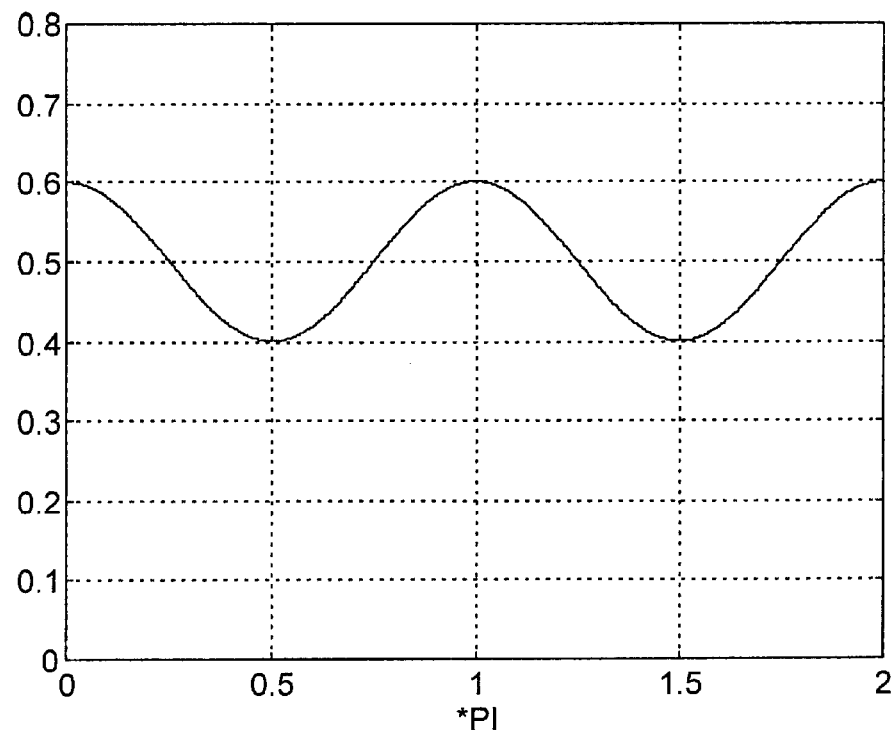
FIG. 1 is a graph of a stator inductance $L_s$ as a function of an angle.
Figure 2:
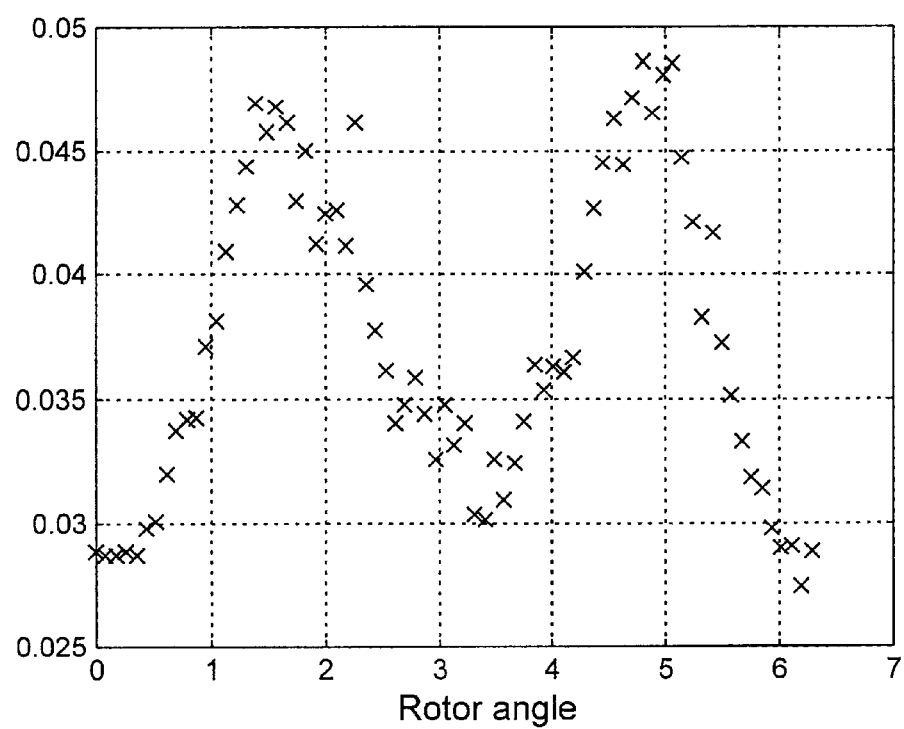
FIG. 2 shows measured magnitudes of stator inductance as a function of an angle.
Figure 4:
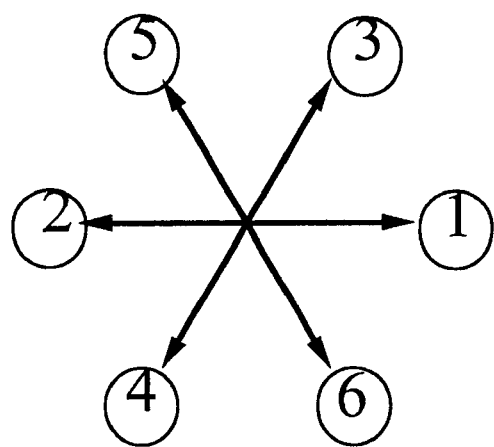
FIG. 4 shows the order of stator inductance measurings.
Figure 5:
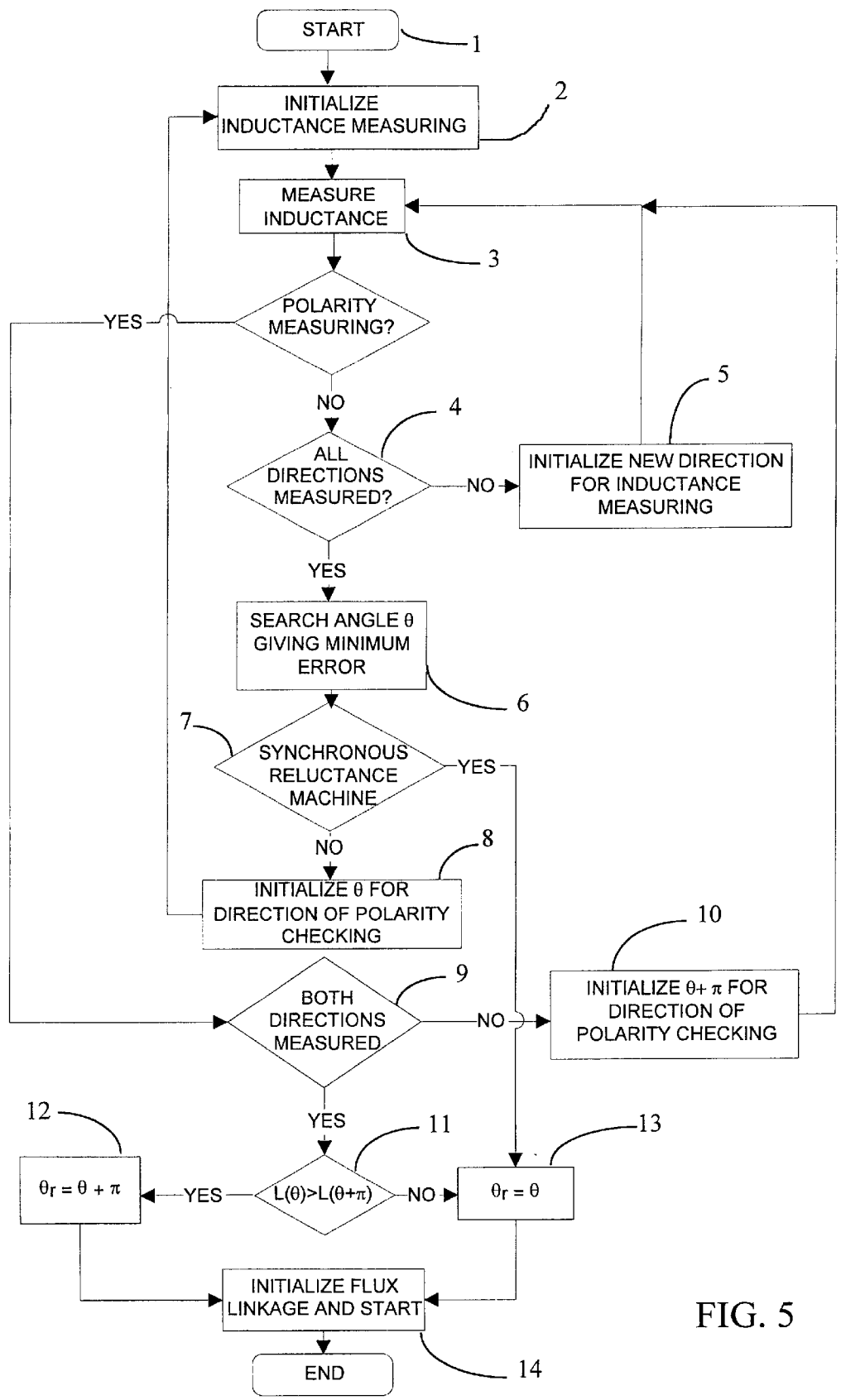
FIG. 5 is a flow chart of the starting procedure in accordance with the invention.

With reference to the flow chart of FIG. 5, in accordance with the invention, after initializing 2 the inductance measuring the stator inductance of the synchronous machine is measured 3 in a plurality of directions. The stator inductance measurement is advantageously effected such that the stator is fed with a voltage pulse generating a current pulse which causes flux linkage on the basis of which the inductance can be calculated. The stator inductance measurement can be performed, for instance, in six directions. These six voltage vectors can readily be implemented with inverters, since the vectors correspond to inverter switch combinations, in which a positive and a negative voltage is generated between each two poles of the three-phase stator. FIG. 4 illustrates six current vectors and their preferable mutual order in connection with measuring. For improved accuracy, a plurality of measurings can be performed in each direction. In order to reduce the possibility that the rotor turns, the measurings are performed in the order shown in FIG. 4, i.e. measuring starts in the direction of 0°, thereafter in the direction of 180°, thereafter in the direction of 60° and so on, until all the directions are measured. FIG. 2 shows measured values of the stator inductance with different rotor angle values. In the flow chart of FIG. 5, it is checked 4 after the inductance measurement 3 if the inductances of all directions determined to be measured are measured, and if not, a new direction is initialized 5 for measuring the inductance in accordance with FIG. 4.

According to the invention, the measured stator inductances are arranged 6 in the determined stator inductance model in order to form model parameters giving the minimum error. Measurement data is preferably arranged in the model by using the method of least mean squares (LMS). In the LMS method, a model is formed for a measurable variable, in which model the data to be measured is arranged such that the square sum is minimized. The square sum refers to a sum of squares of the difference of the measured values and corresponding model values. If the model is linear, the parameters of the model can be solved in a closed form, but in a nonlinear case the question is about a numerically solvable nonlinear optimization task.

In a nonlinear LMS method the following function is minimized $$F(a) = \sum_{i=1}^{m} [f_i(a)]^2 = \sum_{i=1}^{m} f_i(a) f_i(a) = \langle f(a), f(a) \rangle = [f(a)]^2$$

where m is the number of samples (measurements), $f_i = y_i - M(t_i, a)$ is the difference of a nonlinear model M and the measured data $(t_i, y_i)$, $a = [a_1 \, a_2 \, a_3 \, \ldots \, a_n]^T \in \mathfrak{R}^n$ are the model parameters, $f(a) = [f_1(a) \, f_2(a) \, \ldots \, f_m(a)]^T$ is a vector formed by functions $f_n$ $\langle , \rangle$ refers to an inner product.

A gradient of the function F(a) needed in a numerical solution is $$\nabla F(a) = 2J(a)^T f(a)$$

where J(a) is the Jacobian matrix of the function f(a).

In the method, the inductance model is indicated by M and its parameters by $a_1$, $a_2$ and $a_3$ $$y = M(t, a) + \epsilon = a_1 + a_2 \cos(2t + a_3) + \epsilon,$$

where $y = L_s$ is an inductance measured in virtual coordinates, $t = \lambda$ is an angle in the virtual coordinates, i.e. a direction of measuring in the stationary coordinates, $\epsilon$ is a term for measuring error and $a = [a_1 \, a_2 \, a_3]^T = [L_{s0} \, L_{s2} \, \phi]^T$ is a parameter vector of the model.

To solve the parameters of the model, it is possible to use a known conjugate gradient method. However, implementation of the method by commonly employed DSP processors is difficult, so it is worth while utilizing the knowledge that $$L_{s0} = \frac{L_{sd} + L_{sq}}{2},$$

$$L_{s2} = \frac{L_{sd} - L_{sq}}{2},$$

where inductances $L_{sd}$ and $L_{qs}$ are the direct-axis and the quadrature-axis transient inductances.

The inductance model is simplified by assuming that the transient inductances $L_{sd}$ and $L_{sq}$ are previously known. The transient inductances can be measured when introducing the machine by turning the rotor first in a direct-axis position supplying direct current to the stator. After the rotor is turned in the direct-axis position, the stator is supplied in the direct-axis and the quadrature-axis directions with step-like voltage pulses that cause currents on the basis of which the inductances are calculated. Another option is to use the starting procedure such that, instead of solving the angle giving the minimum error, parameters $L_{s0}$ and $L_{s2}$ giving the minimum error are solved.

A simplified inductance model is given by $$y = M(t, a) + \epsilon = L_{s0} + L_{s2} \cos(2t + a) + \epsilon.$$

Only parameter a remains to be solved, and consequently the algorithm used for the solution can be simplified considerably. The above-mentioned known gradient needed for the solution is then simplified to a common derivative according to the following equation $$\nabla F(a) = \frac{d}{da} \left\{ \sum_{i=1}^{m} [f_i(a)]^2 \right\} = 2 \sum_{i=1}^{m} \frac{df_i(a)}{da} f_i(a),$$

where $$\frac{df_i(a)}{da} = -\frac{dM(t_i, a)}{da} = L_{s2} \sin(2t_i + a),$$

$f_i = y_i - M(t_i, a)$ being the difference of the model M and data $(t_i, y_i)$ and m being the number of data.

Minimization of a function with one variable is concerned, which can be implemented simply by a processor, for instance, by reducing the value of the target function M with a given step and by selecting a which produces the minimum value. In said simplified case, the a producing the minimum value is the solution to the initial angle, i.e. the information on the angular position of the synchronous machine rotor.

Since the stator inductance is a function of twice the rotor angle, the above solution is only a candidate for a rotor angle. It is also possible that the solution is said candidate plus 180°. Thus it is not known for sure, whether the direction found is the north or the south pole of rotor magnetization or the permanent magnet.

To find out the polarity, the invention utilizes the fact that the rotor magnetization saturates the direct-axis inductance. On counter magnetization with a stator current, flux density decreases and saturation decreases, on forward magnetization vice versa. Thus, the direct-axis inductance has different magnitudes in the direction of 0° and 180°. After finding a solution candidate, the polarity of the rotor magnetization can be found out by measuring the inductance once more in the direction 8 of the solution candidate and in the direction 10 of 180° therefrom. The inductances of both directions having been measured 9, the lower one of these inductances is selected 11, 12, 13 to be the correct rotor angle.

If the synchronous machine used is a synchronous reluctance machine 7, there is no need to find out the polarity of the machine poles due to the structure of the machine.

The above-described inductance models do not take the saturation of the direct-axis inductance into account, so the polarity of the permanent magnet has to be found out separately. However, it is possible to take the polarity into account in the model, as a result of which it is possible to find out the position angle of the rotor without any separate step of polarity checking. By assuming that the direct-axis inductance changes linearly as a function of the direct-axis current, it is possible to write for the direct-axis inductance $$L_{sd} = L_{sd0} + k \cdot i_{sd}$$

where k is the slope of the inductance and $L_{sd0}$ is its value, when $i_{sd}=0$. By supplying current into the stator in the x-axis direction of the stator coordinates, whereby $i_{sy}=0$, said current in the rotor coordinates is given by $$i_{sd} = i_{sx} \cos\theta_r.$$

The stator inductance is then $$L_s = \frac{L_{sd} + L_{sq}}{2} + \frac{L_{sd} - L_{sq}}{2}\cos 2\theta_r$$
$$= \frac{L_{sd0} + L_{sq}}{2} + \frac{L_{sd0} - L_{sq}}{2}\cos 2\theta_r + \frac{k}{2}i_{sx}\cos\theta_r + \frac{k}{2}i_{sx}\cos\theta_r\cos 2\theta_r.$$

In the above-described manner, a replacement $\theta_r \rightarrow \lambda - \theta_r$ is made, which results in an improved inductance model taking the saturation into account $$y = M(t,a) + \epsilon = a_1 + a_2 \cos(t + a_4/3) + (a_3 + a_2 \cos(t + a_4/3))\cos(2t + a_3) + \epsilon,$$

where parameters $a_n$ are $$a = [a_1 \quad a_2 \quad a_3 \quad a_4]^T = \left[\frac{L_{sd0} + L_{sq}}{2} \quad \frac{k}{2}i_{sx} \quad \frac{L_{sd0} - L_{sq}}{2} \quad \varphi\right]^T.$$

Depending on the number of previously known parameters, the solution can be simplified in the above-described manner.

When the direction of the rotor is found out in accordance with the invention, flux linkages are initialized 14 according to the rotor direction. The objective of the initialization is to adapt the inverter control systems to the conditions in the synchronous machine. After initialization, the synchronous machine can be started in a reliable manner by utilizing any known open-loop vector control method.

It is obvious to a person skilled in the art that as technology progresses the basic idea of the invention can be implemented in a variety of ways. Thus, the invention and its embosdiments are not restricted to the above-described examples but they may vary within the scope of the claims.

What is claimed is:

1. A method of starting open-loop vector control in a synchronous machine, the method comprising the steps of:

determining a stator inductance model of the synchronous machine, measuring the stator inductance in a plurality of directions, arranging measured stator inductances in the determined stator inductance model in order to form model parameters giving the minimum error, checking the magnetization polarity of a rotor in order to verify the direction of the rotor magnetization, initializing flux linkages of the open-loop vector control according to the formed model parameters and the direction of the rotor magnetization, and starting the synchronous machine by the vector control method.

2. A method as claimed in claim 1, wherein the measuring of the stator inductance of the synchronous machine in a plurality of directions comprises the steps of:

supplying a voltage pulse to the stator of the synchronous machine in a plurality of different directions, calculating, on the basis of the voltage pulses supplied in different directions, of the currents generated by the voltage pulses and of the stator resistance, the magnitudes of the flux linkages of corresponding directions, and calculating from the magnitudes of the flux linkages and the currents, the stator inductances of corresponding directions.

3. A method as claimed in claim 1, wherein arranging the measured stator inductances in the determined stator inductance model comprises the step of:

arranging the measured stator inductances in the stator inductance model by the method of least mean squares so as to provide model parameters, the model parameters comprising a solution to an initial angle of the rotor.

4. A method as claimed in claim 1, wherein checking the rotor magnetization polarities comprises the steps of:

measuring the stator inductance in the direction of the initial rotor angle solution including model parameters giving the minimum error, and in the direction of 180 electrical degrees from the initial angle solution, and selecting an angle having the lower stator inductance of the measured inductances to be the initial angle.

* * * * *